United States Patent
Tanaka

(10) Patent No.: US 8,223,644 B2
(45) Date of Patent: Jul. 17, 2012

(54) RADIO APPARATUS AND COMMUNICATION SYSTEM

(75) Inventor: Yasuhiro Tanaka, Aichi (JP)

(73) Assignee: Hera Wireless S.A., Luxembourg (LU)

( * ) Notice: Subject to any disclaimer, the term of this patent is extended or adjusted under 35 U.S.C. 154(b) by 538 days.

(21) Appl. No.: 11/520,710

(22) Filed: Sep. 14, 2006

(65) Prior Publication Data

US 2007/0076581 A1   Apr. 5, 2007

Related U.S. Application Data

(60) Provisional application No. 60/716,494, filed on Sep. 14, 2005.

(51) Int. Cl.
*H04J 3/22* (2006.01)
(52) U.S. Cl. .......................... 370/235; 370/468; 370/474
(58) Field of Classification Search .................. 370/235, 370/252, 413, 473, 474, 468, 528
See application file for complete search history.

(56) References Cited

U.S. PATENT DOCUMENTS

| 6,052,408 | A | * | 4/2000 | Trompower et al. | 375/141 |
| 2002/0042836 | A1 | * | 4/2002 | Mallory | 709/232 |
| 2003/0012298 | A1 | * | 1/2003 | Eudes et al. | 375/298 |
| 2005/0088959 | A1 | | 4/2005 | Kadous | |
| 2005/0164655 | A1 | * | 7/2005 | Nakao et al. | 455/101 |
| 2006/0007883 | A1 | * | 1/2006 | Tong et al. | 370/328 |

FOREIGN PATENT DOCUMENTS

| EP | 1 274 183 A1 | 1/2003 |
| EP | 1 548 990 A1 | 6/2005 |
| JP | 08-116313 | 5/1996 |
| JP | 2004-228669 | 8/2004 |
| JP | 2005-341317 | 12/2005 |

OTHER PUBLICATIONS

International Search Report and Written Opinion of the International Searching Authority issued in corresponding International Patent Application No. PCT/JP2006/318225, dated Dec. 27, 2006.
Japanese Office Action, with English translation, issued in Japanese Patent Application No. 2006-178040, mailed Mar. 1, 2011.

* cited by examiner

*Primary Examiner* — Jianye Wu
*Assistant Examiner* — Mon Cheri S Davenport
(74) *Attorney, Agent, or Firm* — PC Patent Lawyers, PLLC

(57) ABSTRACT

A control unit generates packet signals while controlling an interface (IF) unit, a modulation unit and a baseband processing unit. While dividing each packet signal into a plurality of partial periods, the control unit assigns data to at least part of each of the plurality of partial periods and sets the rate of data, for a partial period placed anterior to each packet signal, higher than that for a partial period placed posterior to the each packet signal. The IF unit, the modulation unit and the baseband processing unit transmit the packet signals thus generated.

6 Claims, 10 Drawing Sheets

FIG.3A

| L-STF | L-LTF | L-SIG | HT-SIG | HT-STF | HT-LTF | DATA 1 |
| L-STF +CDD | L-LTF +CDD | L-SIG +CDD | HT-SIG +CDD | HT-STF +CDD | HT-LTF +CDD | DATA 2 |

FIG.3B

| L-STF | L-LTF | L-SIG | HT-SIG | HT-STF | HT-LTF | DATA 1 | HT-SIG | DATA 3 | ... | HT-SIG | DATA N-1 |
| L-STF +CDD | L-LTF +CDD | L-SIG +CDD | HT-SIG +CDD | HT-STF +CDD | HT-LTF +CDD | DATA 2 | HT-SIG +CDD | DATA 4 | ... | HT-SIG +CDD | DATA N |

FIG.6

| MODULATION SCHEME (42) | CODING RATE (44) |
|---|---|
| BPSK | 1/2 |
| BPSK | 3/4 |
| QPSK | 1/2 |
| QPSK | 3/4 |
| 16QAM | 1/2 |
| 16QAM | 3/4 |
| 64QAM | 2/3 |
| 64QAM | 3/4 |

FIG.7

| 16QAM | 16QAM | 16QAM | QPSK | QPSK | BPSK | BPSK | BPSK |

RADIO APPARATUS AND COMMUNICATION SYSTEM

RELATED APPLICATIONS

This application claims the benefit of U.S. Provisional Patent Application No. 60/716,494, filed on Sep. 14, 2005 the disclosure of which application is incorporated by reference herein.

BACKGROUND OF THE INVENTION

1. Field of the Invention

The present invention relates to radio apparatuses, and it particularly relates to a radio apparatus and a communication system using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The packet signals in such a wireless LAN are generally transferred via a time-varying channel environment and are also subject to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", IEEE Transactions on broadcasting, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of data to be transmitted in parallel in the packet signal is called "stream"). That is, streams up to the maximum number of antennas are set for the communications between the transmitting apparatus and the receiving apparatus so as to improve the data transmission rates.

Moreover, combining such a MIMO system with the OFDM modulation scheme results in a higher data transmission rate. To raise the transmission efficiency of such a MIMO system, the longer packet signal length is preferred. Thus, when transmitting the data to a receiving apparatus, a transmitting apparatus gathers up the data to be transmitted and then generates packet signals. On the other hand, CSMA (Carrier Sense Multiple Access) is carried out to allow the base station apparatus to multiplex the communication with a plurality of terminal apparatuses. In this case, too, it is desirable that the length of packet signal be longer to improve the transmission efficiency. For that purpose, the base station apparatus puts the data for a plurality of terminal apparatuses into a single packet signal. Each terminal apparatus extracts the data transmitted thereto from the received packet signal.

The radio transmission path, or the radio channel, between the base station and terminal apparatus generally varies with time. Thus there are cases where the radio transmission channel varies between the receive start timing and receive end timing of packet signals. Even in such a case, the deterioration in receiving characteristics can remain small if the terminal apparatus updates the weights and the like in a manner of keeping track of and effecting the fluctuation of radio transmission path during a period in which the packet signals are being received. On the other hand, with the purpose of reducing the processing amount in the terminal apparatus or reducing the circuit scale, the weights are set when the packet signals are received and said weights are fixedly used during the receiving of the packet signals. In this case, when the length of packet signal becomes longer, the receiving characteristics deteriorate. In particular, if the data for a plurality of terminal apparatuses are contained in a single packet signal, the possibility increases that a terminal apparatus which is to receive data placed in a posterior part of the packet signal cannot receive all of the data.

SUMMARY OF THE INVENTION

The present invention has been made in View of the foregoing circumstances and a general purpose thereof is to provide a radio apparatus and a communication system which reduce the deterioration in receiving characteristics of data placed in a posterior part of a packet signal even if the packet signal length becomes longer.

In order to solve the above problems, a radio apparatus according to one embodiment of the present invention comprises: a generator which generates packet signals; and a transmitter which transmits the packet signals generated by the generator. While dividing each packet signal into a plurality of partial periods, the generator assigns data to at least part of each of the plurality of partial periods such that a data rate for a partial period positioned in a front part of the each packet signal is higher than that for a partial period positioned in a posterior part of the each packet signal.

According to this embodiment, when a plurality of partial periods are assigned respectively to the terminal apparatuses, a terminal apparatus requiring a low data rate is assigned to a posterior partial period. Hence, the deterioration in the receiving characteristics can be prevented.

Another embodiment of the present invention relates also to a radio apparatus. This apparatus comprises: a generator which generates packet signals in a manner such that each packet signal is divided into a plurality of partial periods and a plurality of terminal apparatuses are assigned respectively to the plurality of partial periods by associating the plurality of partial periods respectively with the plurality of terminal apparatuses; and a transmitter which transmits the packet signals generated by the generator. The generator assigns data to at least part of each of the plurality of partial periods, and when assigning the plurality of terminal apparatuses to the plurality of partial periods, respectively, the generator assigns a terminal apparatus, which is to transmit data of a high data rate, to a partial period positioned in a front part of packet signal.

According to this embodiment, when a plurality of partial periods are assigned respectively to the terminal apparatuses, a terminal apparatus requiring a low data rate is assigned to a posterior partial period. Hence, the deterioration in the receiving characteristics can be prevented.

Each packet signal is composed of a plurality of streams. The generator may set values defined by changing a modulation scheme or coding rate, as a data rate in the each packet signal. In such a case, a wide range of data rates can be realized.

Still another embodiment of the present invention relates also to a radio apparatus. This apparatus comprises: a receiver which receives packet signals; and a demodulation unit which demodulates the packet signals received by the receiver. While the packet signal received by the receiver is being divided into a plurality of partial periods, data is assigned to at least part of each of the plurality of partial periods, and a data rate for a partial period positioned in a front part of the packet signal is higher than that for a partial period positioned in a posterior part of the packet signal. And the demodulation unit demodulates the packet signal while adjusting the data rate.

According to this embodiment, when a plurality of partial periods are assigned respectively to the terminal apparatuses, a terminal apparatus requiring a low data rate is assigned to a posterior partial period. As a result, the deterioration in the receiving characteristics can be prevented.

Still another embodiment of the present invention relates to a communication system. This communication system comprises: a base station apparatus which generates packet signals in a manner such that each packet signal is divided into a plurality of partial periods and a plurality of terminal apparatuses are assigned respectively to the plurality of partial periods by associating the plurality of partial periods respectively with the plurality of terminal apparatuses, and which transmits the generated packet signals; and a terminal apparatus which receives the packet signals transmitted from the base station apparatus. The base station apparatus assigns data to at least part of each of the plurality of partial periods, and when assigning the plurality of terminal apparatuses to the plurality of partial periods, respectively, the base station apparatus assigns a terminal apparatus of a high data rate to a partial period positioned in a front part of packet signal.

Data may be composed of a plurality of streams. A known signal may be composed of a plurality of streams. A control signal may be composed of a plurality of streams.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A and 3B illustrate packet formats in a communication system shown in FIG. 2.

FIG. 6 shows a data structure of a table stored in a control unit shown in FIG. 4;

FIG. 7 shows an example of modulation schemes generated by a control unit shown in FIG. 4;

DETAILED DESCRIPTION OF THE INVENTION

Figure 1:
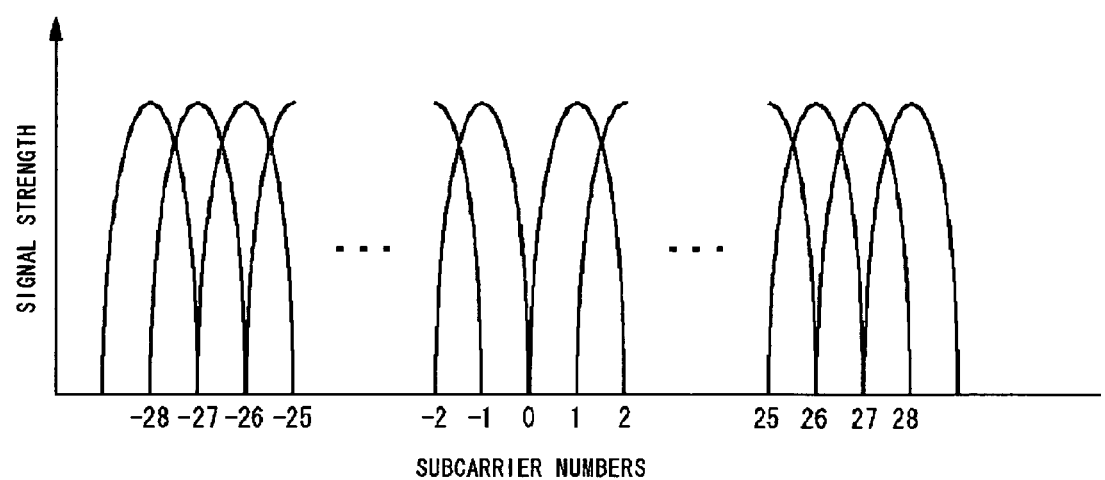
FIG. 1 illustrates a spectrum of a multicarrier signal according to an embodiment of the present invention.

The invention will now be described based on the following embodiments which do not intend to limit the scope of the present invention but exemplify the invention. All of the features and the combinations thereof described in the embodiments are not necessarily essential to the invention.

An outline of the present invention will be given before a detailed description thereof. The embodiments according to the present invention relate to a MIMO system comprised of a plurality of radio apparatuses. One of the radio apparatuses corresponds to a base station apparatus whereas the rest thereof correspond to a plurality of terminal apparatuses. The base station apparatus basically performs CSMA on a plurality of terminal apparatuses. In order to enhance the transmission efficiency, data for a plurality of terminal apparatuses are gathered up so as to generate one packet signal.

The present embodiment is based on the assumption that the speed of data for a terminal apparatus is set variably. For example, the coding rate of error correction and the modulation scheme are set variably. It is to be noted that although the data speed is set variably by increasing the number of streams in a MIMO, it is assumed here for the clarity of explanation that the number of streams does not change in each packet. At the time of receiving packet signals, a plurality of terminal apparatuses derive weights from known signals placed in the header portions of the packet signals, respectively, and execute adaptive array signal processing while using said weights derived. That is, the weight is not updated in the middle of a packet signal. Under such circumstances, a base station apparatus carries out the processing as follows, to restrict the deterioration in the receiving characteristics for a terminal apparatus which is to receive data assigned in a posterior part of a packet signal.

The base station apparatus assigns the data of a high data rate to a front part of the packet signal, and assign the data of a low data rate to a posterior part of the packet signal. When the data speed is defined by the modulation scheme alone, the data of a modulation scheme having a larger number of multi-level, for example, the data of 64-QAM (Quadrature Amplitude Modulation) is assigned to a front part and the data of a modulation scheme having a smaller number of multi-level, for example, the data of BPSK (Binary Phase-Shift Keying) is assigned to a posterior part. A terminal apparatus acquires, from among the packet signal, the data which is destined thereto and demodulates the acquired data. A terminal apparatus which shall demodulate the data of a high data rate acquires the data placed in a front part of the packet signal.

Accordingly, the difference between the timing at which the weights are derived and the timing at which the data are assigned becomes small. As a result, the error in weights due to the variation in radio channel becomes smaller and therefore the deterioration in the receiving characteristics becomes smaller. On the other hand, a terminal apparatus which shall demodulate the data of low data rate acquires the data placed in a posterior part of the packet signal. Thus, difference between the timing at which the weights are derived and the timing at which data are assigned becomes large. As a result, the error in weights due to the variation in radio channel becomes larger, too. However, the deterioration in the receiving characteristics due to the error in weights is prevented if the data rate is low.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal. On the other hand, 52 subcarriers, namely, subcarrier numbers "−26" to "26" are defined in a communication system which is not compatible with a MIMO (such a communication system as this will be hereinafter referred to as a legacy system). One example of legacy systems is a wireless LAN complying with the IEEE802.11a standard.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM. Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream" herein. As a result thereof, since the mode of modulation scheme, the coding rate and the number of streams are set variably, the data rate is also set variably. It is to be noted that the "data rates" may be determined by arbitrary combination of these factors or by one of them.

Figure 2:
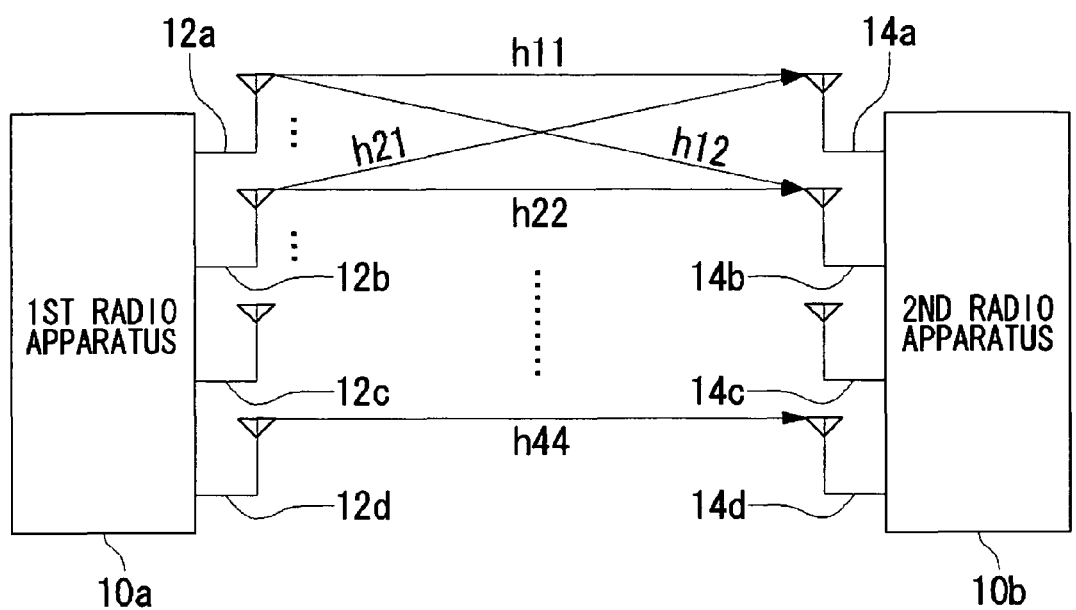
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically referred to as "radio apparatus 10". The first radio apparatus 10a includes a first antenna 12a, a second antenna 12b, a third antenna 12c and a fourth antenna 12d, which are generically referred to as "antennas 12". The second radio apparatus 10b includes a first antenna 14a, a second antenna 14b, a third antenna 14c and a fourth antenna 14d, which are generically referred to as "antennas 14". Here, the first radio apparatus 10a corresponds to a base station apparatus, whereas the second radio apparatus 10b corresponds to a terminal apparatus. The first radio apparatus 10a may connect to a plurality of terminal apparatuses, not shown. Here the plurality of terminal apparatuses not shown are represented by a third radio apparatus 10c, fourth radio apparatus 10d and the like. When connecting to the plurality of terminal apparatuses, the first radio apparatus 10a basically performs CSMA.

An outline of a MIMO system will be explained before the description of a structure of the communication system 100. Assume herein that data are being transmitted from the first radio apparatus 10a to the second radio apparatus 10b. The first radio apparatus 10a transmits respectively the data of multiple streams from the first antenna 12a to the fourth antenna 12d, respectively. As a result, the data rate becomes higher. The second radio apparatus 10b receives the data of multiple streams by the first antenna 14a to the fourth antenna 14d. The second radio apparatus 10b separates the received signals by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between the first antenna 12a and the second antenna 14b by $h_{12}$, that between the second antenna 12b and the first antenna 14a by $h_{21}$, that between the second antenna 12b and the second antenna 14b by $h_{22}$, and that between the fourth antenna 12d and the fourth antenna 14d by $h_{44}$. For the clarity of illustration, the other transmission channels are omitted in FIG. 2.

FIGS. 3A and 3B illustrate packet formats used by a communication system 100. FIG. 3A illustrates a case where a packet signal is composed of a plurality of streams and one of the streams contains data for a terminal apparatus. Here, data contained in two streams are to be transmitted, and the packet formats corresponding to the first stream and the second stream are shown in the top row and the bottom row, respectively. The number of streams may be greater than 2. In the packet signal corresponding to the first stream, "L-STF", "HT-LTF" and so forth are assigned as preamble signals. "L-STF", "L-LTF" and "L-SIG" and "HT-SIG" correspond to a known signal for use with timing estimation compatible with a legacy system, a known signal for use with channel estimation compatible with a legacy system, a control signal compatible with a legacy system and a control signal compatible with a MIMO system, respectively. For example, information on data rates is contained in the control signal compatible with a MIMO system. The information on data rates is comprised of information on modulation schemes and the values of the coding rates and the number of streams. "HT-STF" and "HT-LTF" correspond to a known signal for use with timing estimation compatible with a MIMO system and a known signal for use with channel estimation compatible with a MIMO system, respectively. "DATA 1" is a data signal.

In the packet corresponding to the second stream, "L-STF+CDD", "HT-LTF+CDD" and so forth are assigned as preamble signals. Here, "CDD" indicates that CDD (Cyclic Delay Diversity) is applied. The CDD is a processing where in a predetermined interval a time-domain waveform is shifted, by a shift amount, in a posterior direction and then the waveform pushed out of the rearmost part in the predetermined-interval is assigned cyclically in a header portion of the predetermined interval. That is, a cyclic timing shift is applied to "L-STF" in "L-STF+CDD". Here, the amount of timing shift in "L-STF+CDD" may differ from the amount of timing shift in "HT-LTF+CDD".

The same is true for a case where "L-STS" and the like are assigned to a third stream and the like. In this case, too, the amount of timing shift in CDD in the third stream may differ from that in the second stream. The portions from "L-LTF" through "HT-SIG1" or the like use "52" subcarriers in the same way as in a legacy system. Among "52" subcarriers, "4" subcarries correspond to pilot signals. On the other hand, the portions from "HT-LTF" onward use "56" subcarriers.

FIG. 3B illustrates packet formats in the case where data for a plurality of terminal apparatuses are contained in a single stream. Referring to FIG. 3B, the structure of "L-STF" through "Data 1" and the structure of "L-STF+CDD" through "Data 2" are the same as those of FIG. 3A. In FIG. 3B, "HT-SIG" and "HT-SIG+CDD" are placed posterior to "Data 1" and "Data 2", respectively. And "Data 3" and "Data 4" are placed posterior to the "HT-SIG" and "HT-SIG+CDD", respectively. Here, the combination of two HT-SIGs and Data assigned posterior to "Data 1" and "Data 2" is called a "block". "Data 1" and "Data 2" may also be included in the concept of this "block".

In FIG. 3B, (N/2-1) blocks are contained in a packet signal. Now, when each of a plurality of blocks is assigned to each different terminal apparatus, data for a plurality of terminal apparatuses is contained in one packet signal. The data rate for data may differ block by block. In such a case, "HT-SIG" contained in the same block as the Data contains information on the data rate for said Data. On the other hand, it is assumed that the number of streams is constant across one packet signal. It is assumed here that two streams are contained in a single packet signal. Accordingly, the information on data rates is indicated by the modulation scheme and coding rate in the data.

Figure 4:
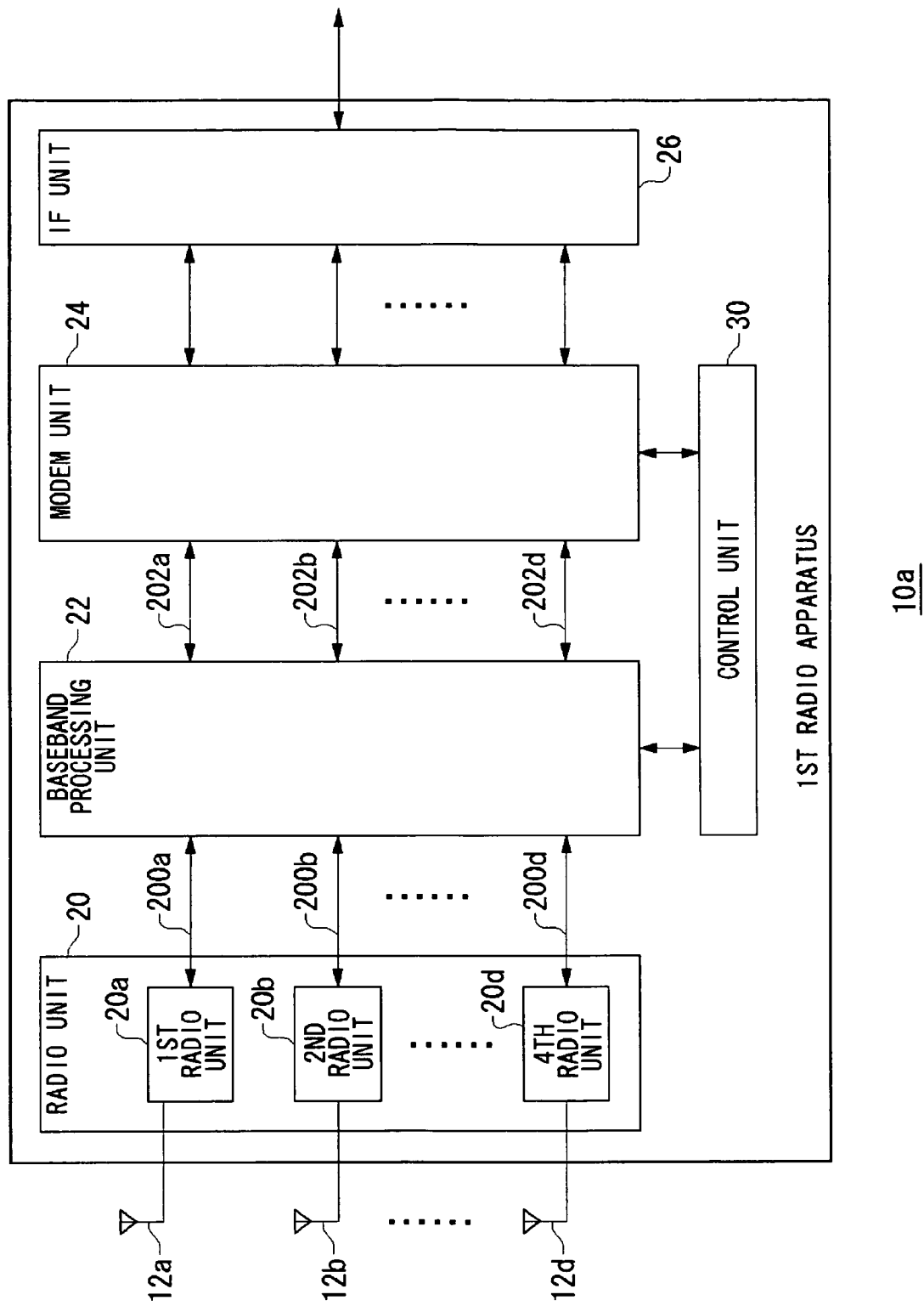
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". It is to be noted that the second radio apparatus 10b is so structured as to correspond to the first radio apparatus 10a. As described earlier, if the first radio apparatus 10a corresponds to the base station apparatus, the second radio apparatus 10b will correspond to a terminal apparatus.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included.

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
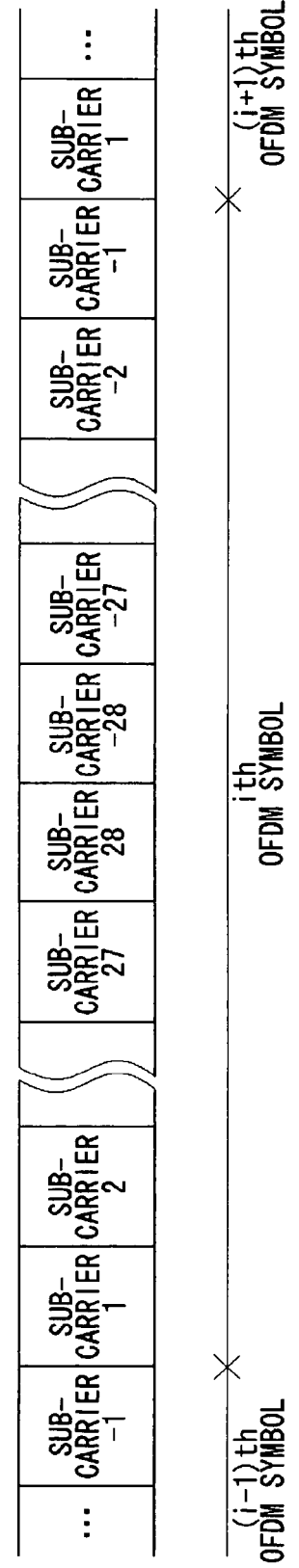
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol.

Now refer back to FIG. 4. The baseband processing unit 22 performs CDD to generate packet signals corresponding to FIGS. 3A and 3B. CDD is performed as a matrix C expressed by the following Equation (1).

$$C(\lambda)=\mathrm{diag}(1, \exp(-j2\pi\lambda\delta/N\mathrm{out}), \Lambda, \exp(-j2\pi\lambda\delta(N\mathrm{out}-1)/N\mathrm{out})) \qquad (1)$$

where δ indicates a shift amount and λ indicates the subcarrier number. The multiplication of C with streams is carried out per subcarrier. That is, the baseband processing unit 22 performs a cyclic time shifting within L-STS or the like on a stream-by-stream basis. When the number of streams is 3 or greater, the shift amount is each set to a different value per stream.

As a receiving processing, the modem unit 24 demodulates and decodes the frequency-domain signal 202 outputted from the baseband processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the baseband processing unit 22 as a frequency-domain signal 202. When the transmission processing is carried out, the modulation scheme and coding rate are specified by the control unit 30.

As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Then the IF unit 26 outputs the thus separated data to a plurality of modem units 24.

The control unit 30 controls the timing and the like of the first radio apparatus 10a. The control unit 30 generates packet signals as shown in FIGS. 3A and 3B while controlling the IF unit 26, the modem unit 24 and the baseband processing unit 22. The description is given here of a case when a packet signal in the packet format shown in FIG. 3B is generated, the same holds for the case when a packet signal in the packet format shown in FIG. 3A is generated. That is, if part of the processing explained below is executed, the packet signal as shown in FIG. 3A will be produced.

While dividing a packet signal into a plurality of partial periods, namely, the above-described blocks and associating a plurality of blocks respectively with a plurality of terminal apparatuses, the control unit 30 allocates the plurality of terminal apparatuses to the plurality of blocks, respectively. In each of a plurality of blocks, Data is assigned at least part thereof. That is, a terminal apparatus is allocated to a block that contains "Data 1" and "Data 2" and another terminal apparatus is allocated to a block that contains "Data 3" and "Data 4". When allocating the terminal apparatuses, the control unit 30 executes the following processing.

When allocating a plurality of terminal apparatuses respectively to a plurality of blocks, the control unit 30 allocates a terminal apparatus which is to transmit data of a high data rate, to a block positioned anteriorly in the packet signal. On the other hand, the control unit 30 allocates a terminal apparatus which is to transmit data of a low data rate, to a block positioned posteriorly in the packet signal. Here, the data of a high data rate is equivalent to a case where the data rate for data contained in a block is high and the data of a low data rate is the converse. Whether the data rate is high or low is determined based on the relative comparison among the data. Also, whether being positioned anterirorly or posteriorly is determined based on the relative comparison. Thus, these are not determined by the absolute measure. It is assumed also that the control unit 30 has acquired beforehand the data rate for data to be transmitted to a terminal apparatus.

For instance, the control unit 30 transmits a request signal of data rate information to a terminal apparatus via the radio unit 20, and receives and obtains from the terminal apparatus the data rate information as its response signal. The control unit 30 may receive signals from the terminal apparatus via the baseband processing unit 22, the modem unit 24 and the like and may estimate the data rate for said terminal apparatus based on said signal. In this case, the control unit 30 estimates the data rate in response to the strength of a received signal. In so doing, since the control unit 30 has stored beforehand a table which associates the strength of received signals with the data rates, the control unit 30 can derive a data rate from the strength of a received signal by referring to this table.

Furthermore, as shown in FIG. 3B, the control unit 30 forms a packet signal by a plurality of streams. Here, while fixing the number of streams and varying the modulation scheme and the coding rate, the control unit 30 sets a specified value as a data rate. That is, the control unit 30 selects any among "2" to "4" as the number of streams, and maintains the thus selected value across one packet signal. It is to be noted that the number of streams may not be fixed. FIG. 6 shows a data structure of a table stored in the control unit 30. Referring to FIG. 6, the table includes a modulation scheme column 42 and a coding rate column 44. A data rate is determined by the combination of a modulation scheme contained in the modulation scheme column 42 and a coding rate contained in the coding rate column 44. Although the final data rate is determined by combining these with the number of streams, the modulation scheme and the coding rate are set variably, as described above, in each packet signal.

Figure 7:
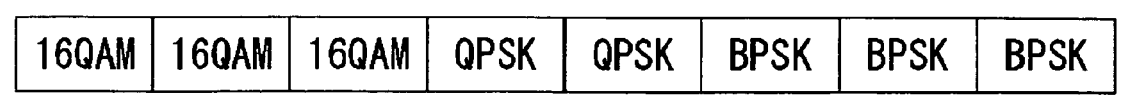

FIG. 7 shows an example of modulation schemes in the packet signals generated by the control unit 30. In FIG. 7, the blocks shown in FIG. 3B are indicated by one unity. That is, "HT-SIG", "HT-SIG+CDD", "DATA 3" and "DATA 4" are indicated as one coherent group. For the clarity of explanation, it is assumed here that the data rate is determined by the modulation scheme alone, and FIG. 7 shows the modulation schemes corresponding to the data contained in the blocks. As described earlier, the data of a modulation scheme having a larger number of multi-level is assigned to an anterior block of a packet signal whereas the data of a modulation scheme having a smaller number of multi-level is assigned to a posterior block of the packet signal. As shown in FIG. 7, the data whose modulation scheme is "16-QAM" is assigned to a front part whereas the data whose modulation scheme is "BPSK" is assigned to a posterior part.

Now refer back to FIG. 4. When the control unit 30 transmits a packet signal in such a packet format as shown in FIG. 3B and FIG. 7, the control unit 30 transmits a control signal to a plurality of terminal apparatuses prior to this transmission. This control signal contains an identification number of a terminal apparatus corresponding to a block and information associated with the timing at which said block is assigned. The terminal apparatus acquires from the control signal the timing corresponding to its own block. The terminal apparatus also identifies, from the content of HT-SIG contained in the block corresponding to the acquired timing, the modulation scheme and coding rate of the data contained in said block. Furthermore, the terminal apparatus demodulates the data by the identified modulation scheme and coding rate. Even in a case where such a control signal is not transmitted, HT-SIG contained in each block may contain the identification number of a terminal apparatus which shall receive the data contained in said block. The terminal apparatuses identify the data to be received, by checking the contents of HI-SIGs contained respectively in a plurality of blocks.

In the description given so far, the baseband processing unit 22 included in a terminal apparatus derives the weights for adaptive array signal processing, based on "L-LTF" and "HT-LTF" shown in FIGS. 3A and 3B. However, it is assumed that the weights are not updated among "HT-SIG", "Data 1" and the like. That is, the weight derived in a header portion of a packet signal will be used across said packet signal. Accordingly, a difference in error between the actual radio channel and the weight will be large in a posterior part of the packet signal. On the other hand, if the data rate is low, the data error is more unlikely to occur than if the data rate is high. Thus, placing the data having a low data rate in a posterior part of a packet signal can prevent the occurrence of error in this part.

Figure 8:
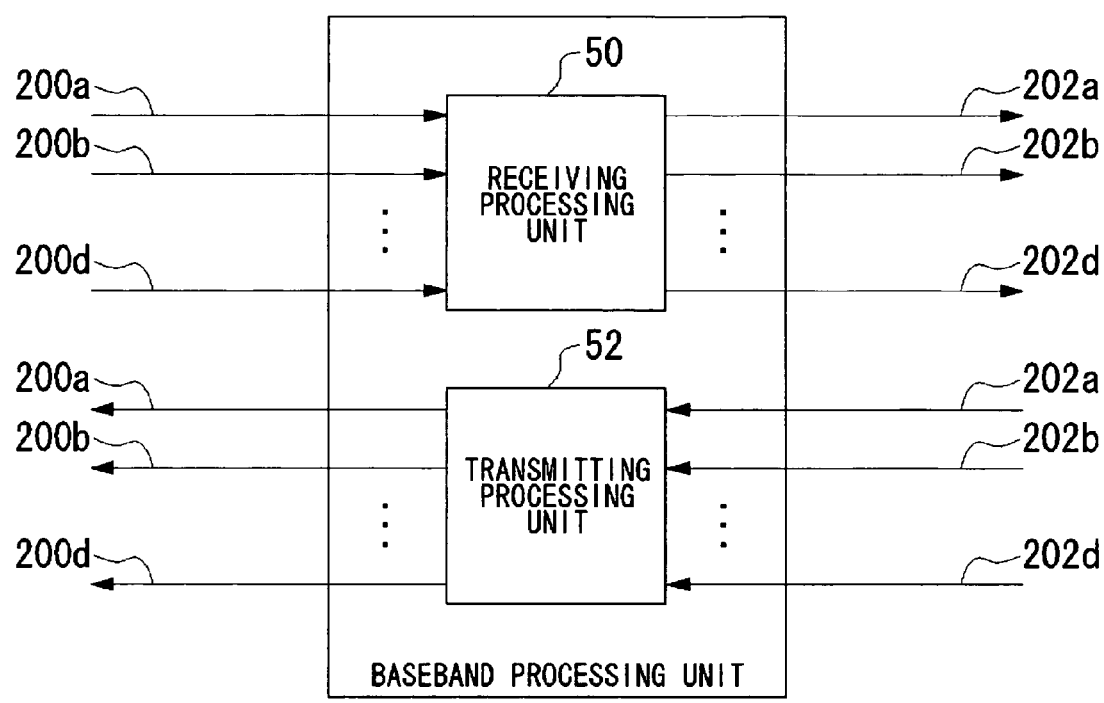
FIG. 8 illustrates a structure of a baseband processing unit shown in FIG. 4.

FIG. 8 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and therefore derives the channel characteristics in the frequency domain and derives receiving weight vectors. Then the receiving processing unit 50 outputs the result of array synthesis as the frequency-domain signal 202.

The transmitting processing unit 52 executes a part, corresponding to a transmission operation, of operations by the baseband processing unit 22. That is, the transmitting processing unit 52 converts the frequency-domain signals 202 so as to generate the time-domain signals 200. The transmitting processing unit 52 associates a plurality of streams respectively with a plurality of antennas 12. The transmitting processing unit 52 also executes CDD as shown in FIGS. 3A and 3B. Finally, the transmitting processing unit 52 outputs the time-domain signals 200.

Figure 9:
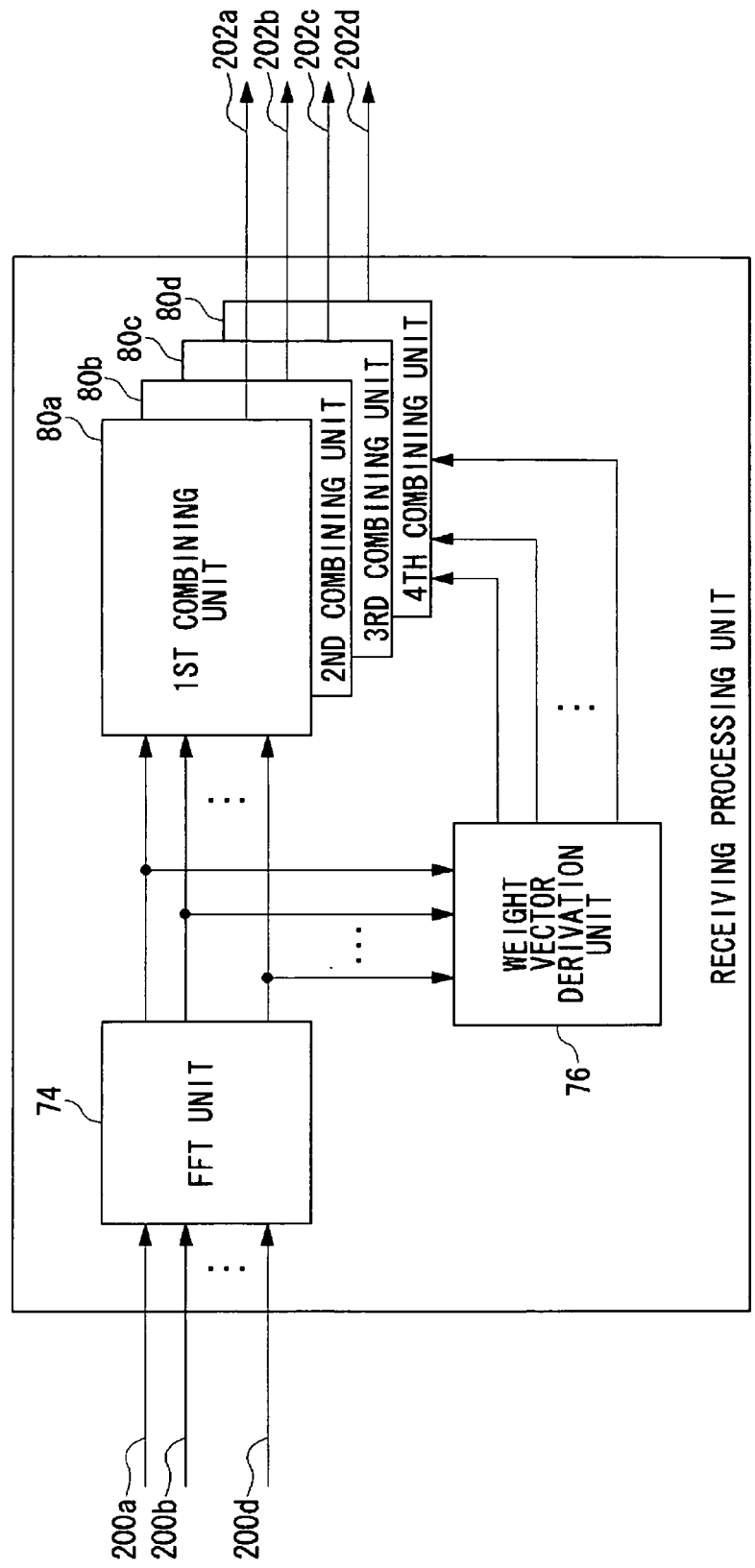
FIG. 9 illustrates a structure of a receiving processing unit shown in FIG. 8.

FIG. 9 illustrates a structure of the receiving processing unit 50. The receiving processing unit 50 includes an FFT unit 74, a weight vector derivation unit 76, and a first combining unit 80a, a second combining unit 80b, a third combining unit 80c and a fourth combining unit 80d, which are generically referred to as "combining unit 80".

The FFT unit 74 performs FFT on the time-domain signal 200 so as to convert the time-domain signal 200 into a frequency-domain value. It is assumed here that the frequency-domain value is structured as shown in FIG. 5. That is, a frequency-domain value for one time-domain signal 200 is outputted via one signal line.

The weight vector derivation unit 76 derives a weight vector from a frequency-domain value, on a subcarrier-by-subcarrier basis. The weight vector is so derived as to correspond to each of a plurality of streams, and a weight vector for one stream contains factors corresponding to the number of antennas, for each stream. HT-LTF and the like are used to derive a weight vector corresponding to each of a plurality of streams. To derive the weight vector, an adaptive algorithm may be used or a channel characteristics may be used. Since a known technique may be employed in the processing for the adaptive algorithm and so forth, the explanation thereof is omitted here. As described earlier, the weight vector derivation unit 76 derives weights in a header portion of the packet signal, and the thus derived weight will not be updated during the period of this packet signal. As described earlier, the weights are finally derived per subcarrier, per antenna 12 and per stream.

The combining unit 80 combines the frequency-domain value converted by the FFT unit 74 and the weight vector from the weight vector derivation unit 76. For example, as the weight vector to which a multiplication is to be executed, a weight which corresponds to both one subcarrier and the first stream is selected from among the weight vectors from the weight vector derivation unit 76. The selected weight has a value corresponding to each antenna 12.

As another weight vector to which a multiplier is to be executed, a value corresponding to one subcarrier is selected from among the frequency-domain values converted by the FFT unit 74. The selected value contains a value corresponding to each antenna 12. Note that both the selected weight and the selected value belongs to the same subcarrier. While being associated respectively with the antennas 12, the selected weight and the selected value are respectively multiplied and the multiplication results are summed up. As a result, a value corresponding to one subcarrier in the first stream is derived. In the first combining unit 80a, the above-described processing is performed on the other subcarriers so as to derive data corresponding to the first stream. The similar processing is carried out to derive data corresponding respectively to the second to fourth streams. The derived first to fourth streams are outputted as the first frequency-domain signal 202a to the fourth frequency-domain signal 202d, respectively.

Figure 10:
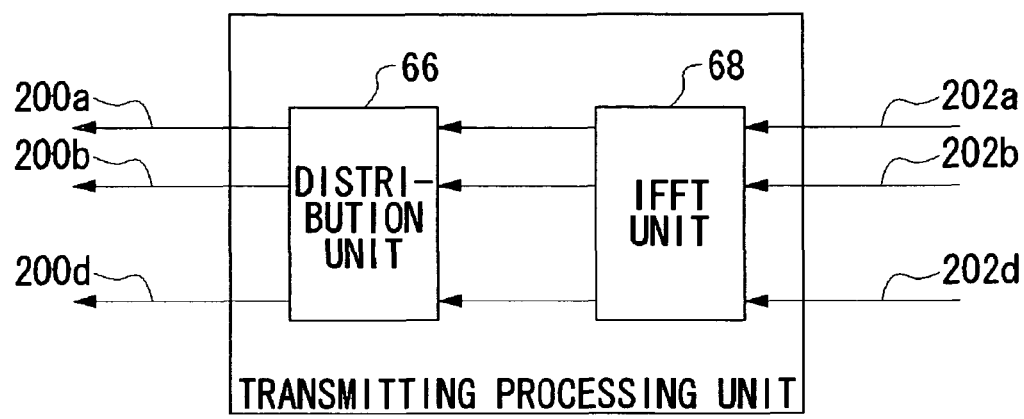
FIG. 10 illustrates a structure of a transmitting processing unit shown in FIG. 8.

FIG. 10 illustrates a structure of the transmitting processing unit 52. The transmitting processing unit 52 includes a distribution unit 66 and an IFFT unit 68. The IFFT unit 68 performs IFFT on the frequency-domain signals 202 and then outputs time-domain signals. As a result thereof, the IFFT unit 68 outputs the time-domain signal corresponding to each stream.

The distribution unit 66 associates the streams from the IFFT unit 68 with the antennas 12. Since it is assumed here that the number of antennas 12 used is identical to the number of streams, each stream is directly associated with each antenna 12. The distribution unit 66 applies CDD to the streams to be transmitted, namely, "L-SIG" and the like among the respective packet signals.

An operation of the radio apparatus 10 structured as above will now be described. The control unit 30 included in the first radio apparatus 10a serving as a base station apparatus receives information on data rates from a plurality of terminal apparatuses, respectively, and determines the data rates, for the plurality of terminal apparatuses, respectively, used when the data are to be transmitted. The control unit 30 produces packet signals each composed of a plurality of blocks. Note that the number of streams contained in a packet signal is fixed to any of 2 to 4. The control unit 30 assigns data of a high data rate to an anterior part in a plurality of blocks and assigns data of a low data rate to a posterior part in the plurality of blocks. The control unit 30 also produces control signals that contain information in which the identification numbers of terminal apparatuses corresponding to the assigned data are associated with the timings of assigned blocks. After sending the control signal, the modem unit 24, the baseband processing unit 22 and so forth transmit the packet signals.

On the other hand, the control unit 30 contained in the terminal apparatus acquires the timing where a block to be received is assigned, from the control signal received via the baseband processing unit 22, the modem unit 24 and the like. The baseband processing unit 22, the modem unit 24 and the like receive the packet signals, and the baseband processing unit 22 derives a weight in the header portion of the packet signal. While using the derived weight over the period of the packet signal, the baseband processing unit 22 performs adaptive array signal processing on the packet signals. Then the baseband processing unit 22, the modem unit 24 and so forth receive blocks, based on the acquired timings and demodulate HT-SIG and Data, respectively.

According to the embodiments of the present invention, when a plurality of blocks contained in a packet signal are assigned respectively to terminal apparatuses, a terminal apparatus requiring a low data rate is assigned in a posterior block, so that the degradation in the receiving characteristics can be suppressed. Even in a case when a terminal apparatus derives weights only in a header portion of the packet signal and the error contained in weights in a posterior part is enlarged, a terminal apparatus requiring a low data rate is assigned to a posterior block. As a result, the effect of error contained in the weights can be reduced in such a case and therefore the deterioration in the receiving characteristics can be suppressed. Since the terminal apparatus receives only the data of a specified timing, any complicated control which would have to be done otherwise at the terminal apparatus can be eliminated.

Since the terminal apparatus derives the weight only in the header portion of the packet signal, the amount of processing required by the terminal apparatus can be reduced. The reduction in the amount of processing required by the terminal apparatus allows a reduced power consumed by the terminal apparatus. The terminal apparatus transmits a control signal beforehand and informs, via this control signal, the timing where the blocks are assigned. Hence, the terminal apparatus can stop the receiving operation at the timings other than this informed timing and therefore the power consumption can be reduced. Since the number of streams contained in the packet signal can be fixed to a certain value, the resetting of AGC and the like in the terminal apparatus can be eliminated. Having eliminated the resetting of AGC and the like makes the processing by the terminal apparatus simpler. Since the data for a plurality of terminals are contained in a single packet, the transmission efficiency can be significantly improved.

The present invention has been described based on the embodiments. These embodiments are merely exemplary, and it is understood by those skilled in the art that various modifications to the combination of each component and process thereof are possible and that such modifications are also within the scope of the present invention.

According to the present embodiment, the control unit 30 assigns different terminal apparatuses to a plurality of different blocks contained in each packet signal. However, the prevent invention is not limited thereto and a plurality of blocks may be assigned to a single terminal apparatus. In such a case, the data rate for a block placed in an anterior part of each packet signal is set higher than the data rate for a block placed in a posterior part of each packet signal. The terminal apparatus receives packet signals by the radio unit 20 and so forth, and demodulates the packet signals by the modem unit 24. Here, the modem unit 24 demodulates the packet signals by adjusting the data rate. According to this modification, the data rates in posterior parts are set to lower values, the deteriorated data error in the posterior parts of the packet signal can be restricted. In other words, it is only required that the data rate in each packet signal be lower as the assigned position gets rearward.

In the present embodiments of the present invention, the communication system 100 uses multi-carriers. However, the present invention is not limited thereto and, for example, single carriers may be used instead. According to this modification, the present invention can be applied to various types of communication systems.

While the preferred embodiments of the present invention have been described using specific terms, such description is for illustrative purposes only, and it is to be understood that changes and variations may be made without departing from the spirit or scope of the appended claims.

What is claimed is:

1. A base station apparatus, comprising:
   a generator which generates a packet signal which includes a known signal and a plurality of blocks each including a control signal and data, a series of the plurality of blocks being serially arranged in the time direction subsequent to the known signal; and
   a transmitter which transmits the packet signal generated by said generator, wherein
   the plurality of blocks included in the packet signal generated by the generator are assigned to different terminal apparatuses, respectively, in which terminal apparatuses that transmit data at a higher data rate are assigned to blocks closer to the known signal in the time direction than terminal apparatuses that transmit data at a lower data rate.

2. A base station apparatus, comprising:
   a generator which generates a packet signal which includes a known signal and a plurality of blocks each including a control signal and data, a series of the plurality of blocks being serially arranged in the time direction; and
   a transmitter which transmits the packet signal generated by said generator, wherein
   the plurality of blocks included in the packet signal generated by the generator are assigned to different terminal apparatuses, respectively, in which terminal apparatuses that transmit data at a higher data rate are assigned to blocks located anteriorly in the time direction than terminal apparatuses that transmit data at a lower data rate.

3. A base station apparatus according to claim 1, wherein the packet signal is composed of a plurality of streams and said generator sets values defined by changing a modulation scheme or coding rate, as a data rate in the packet signal.

4. A base station apparatus according to claim 2, wherein the packet signal is composed of a plurality of streams and said generator sets values defined by changing a modulation scheme or coding rate, as a data rate in the packet signal.

5. A terminal apparatus, comprising:
   a receiver which receives a packet signal which includes a known signal and a plurality of blocks each including a control signal and data, a series of the plurality of blocks being serially arranged in the time direction subsequent to the known signal; and
   a demodulation unit which demodulates the packet signal received by said receiver, wherein
   the plurality of blocks included in the packet signal received by the receiver are assigned to different terminal apparatuses, respectively, in which terminal apparatuses that transmit data at a higher data rate are assigned to blocks closer to the known signal in the time direction than terminal apparatuses that transmit data at a lower data rate.

6. A communication system, comprising
   a base station apparatus which generates a packet signal which includes a known signal and a plurality of blocks each including a control signal and data, a series of the plurality of blocks being serially arranged in the time direction subsequent to the known signal; and
   a terminal apparatus which receives the packet signal transmitted from said base station apparatus, wherein
   the plurality of blocks included in the packet signal generated by the base station apparatus are assigned to different terminal apparatuses, respectively, in which terminal apparatuses that transmit data at a higher data rate are assigned to blocks closer to the known signal in the time direction than terminal apparatuses that transmit data at a lower data rate.

* * * * *